Dec. 15, 1936.    K. G. KUTCHKA    2,064,546
GLASS MELTING TANK
Filed April 6, 1935    5 Sheets-Sheet 3

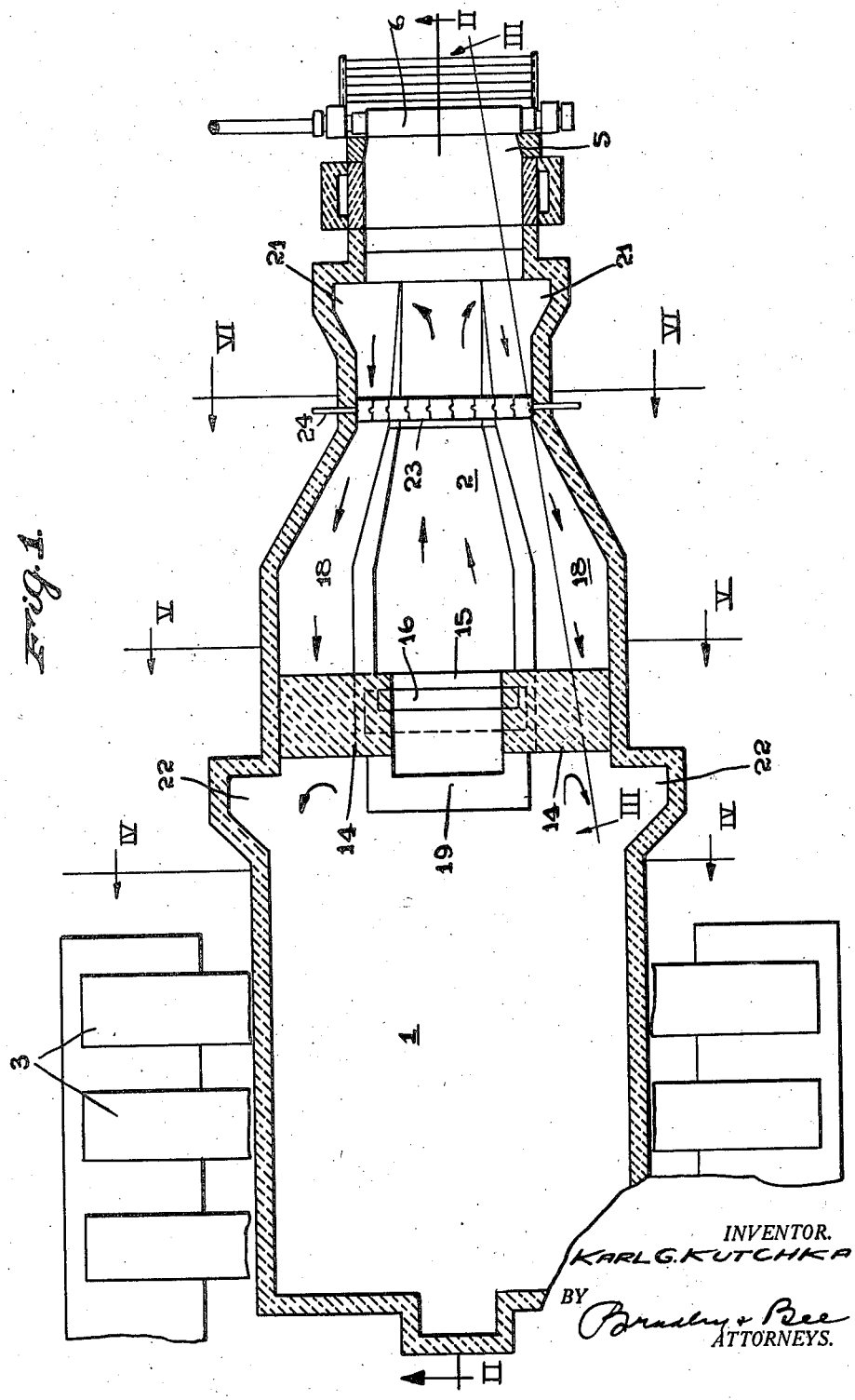

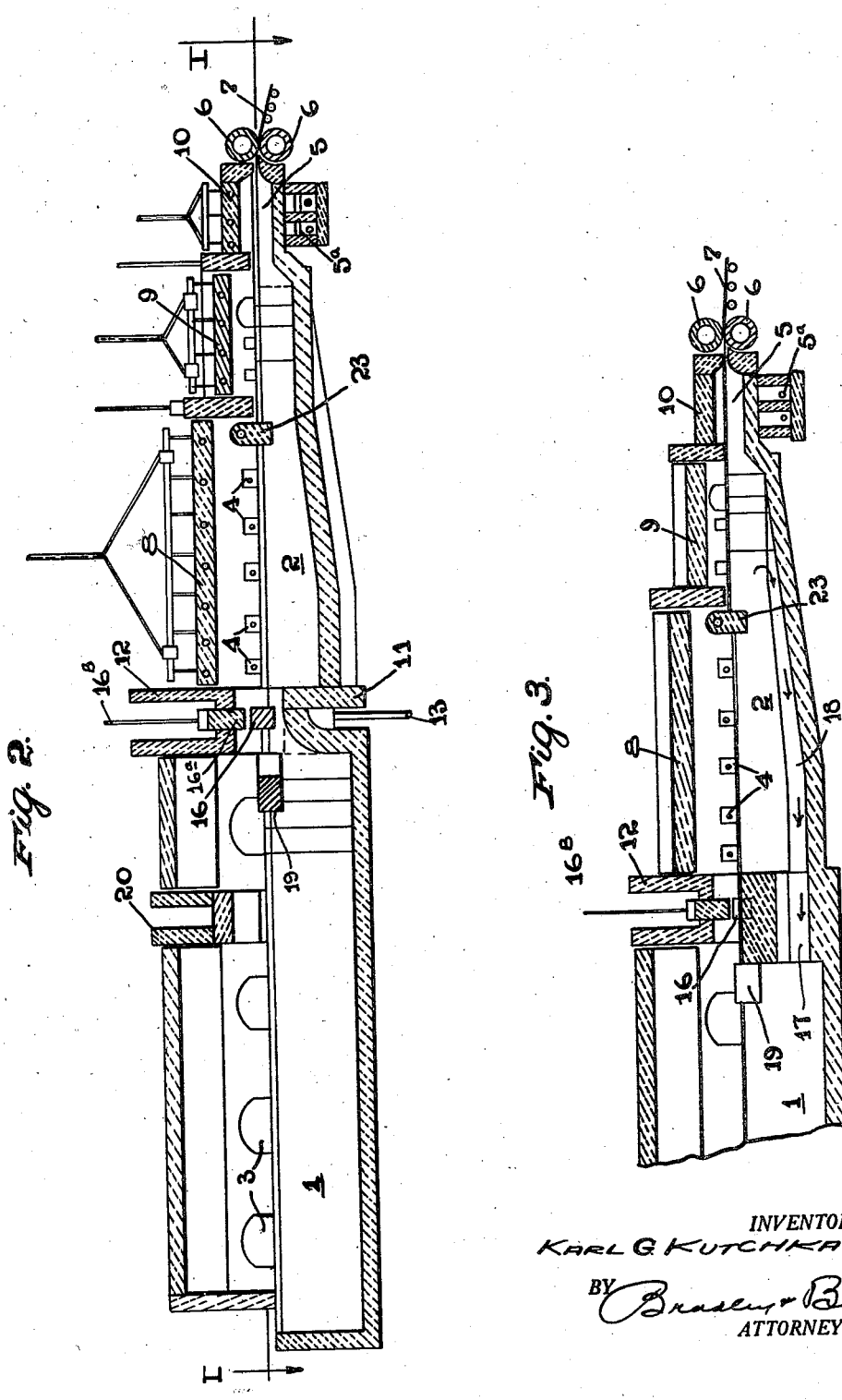

INVENTOR.
KARL G. KUTCHKA
BY Bradley & Bee
ATTORNEYS.

Dec. 15, 1936.  K. G. KUTCHKA  2,064,546
GLASS MELTING TANK
Filed April 6, 1935  5 Sheets-Sheet 4
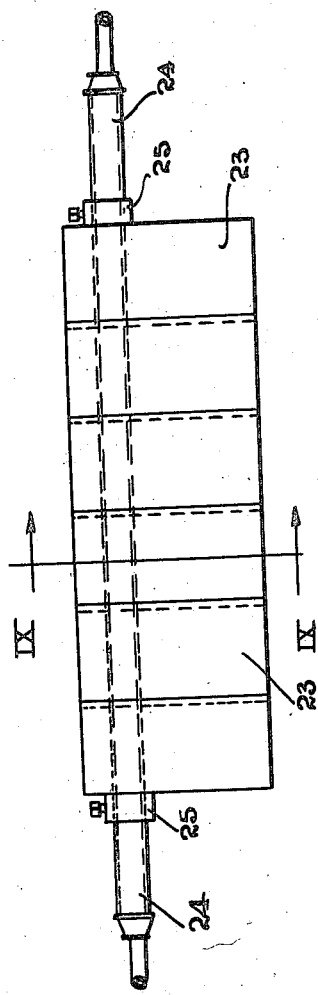
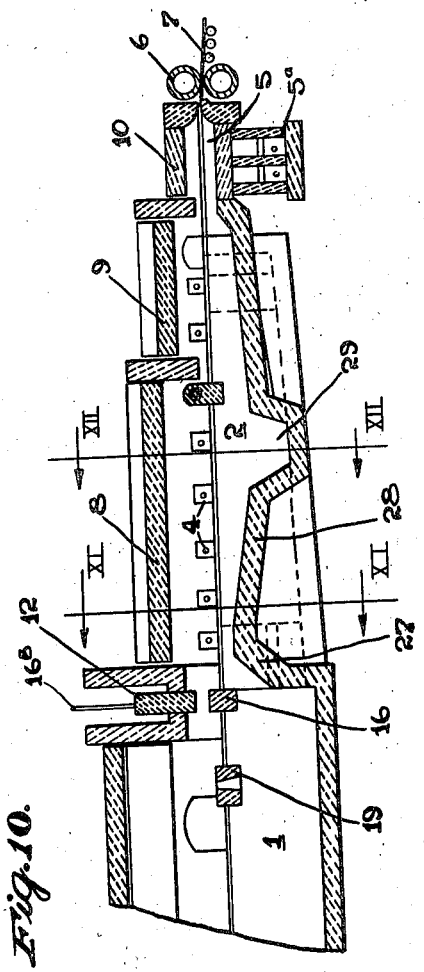
INVENTOR.
KARL G. KUTCHKA
BY Bradley & Bee
ATTORNEYS.

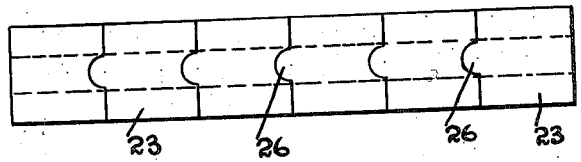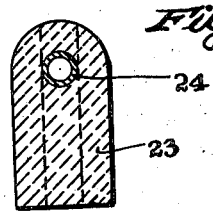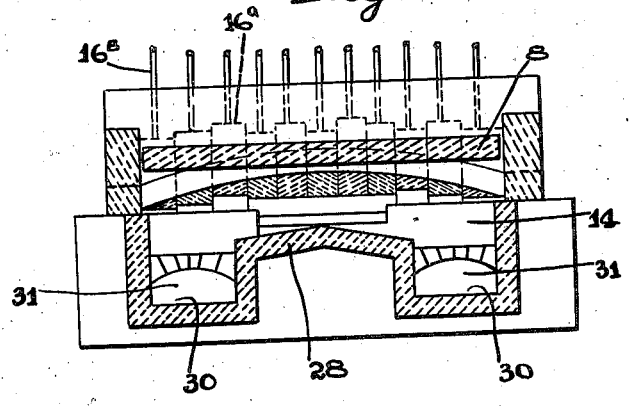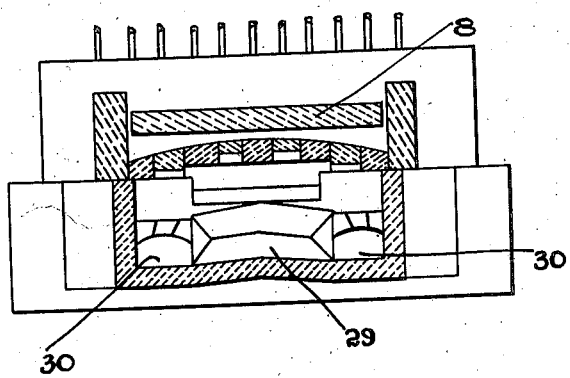

Patented Dec. 15, 1936

2,064,546

UNITED STATES PATENT OFFICE 2,064,546

GLASS MELTING TANK

Karl G. Kutchka, Wilkinsburg, Pa., assignor to Pittsburgh Plate Glass Company, a corporation of Pennsylvania Application April 6, 1935, Serial No. 15,027

12 Claims. (Cl. 49—54)

Figure 4:
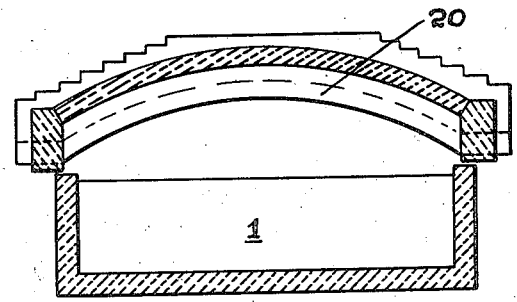
Figure 5:
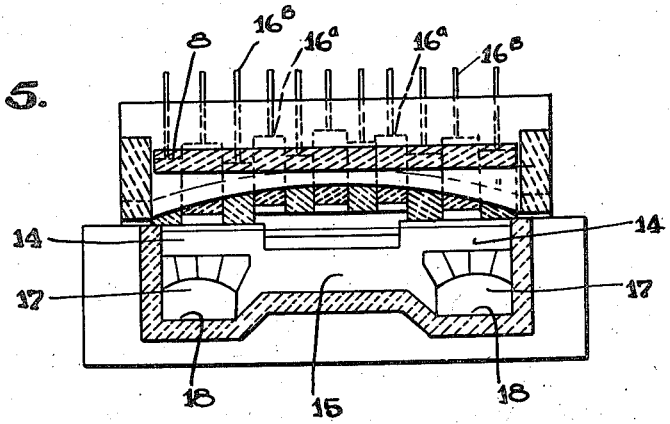
Figure 6:
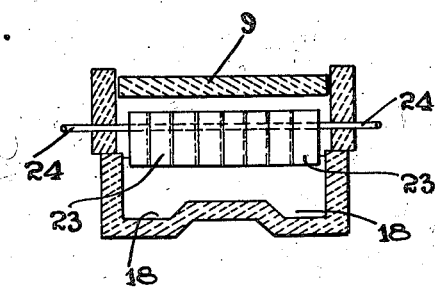

The invention relates to a glass melting tank and more particularly to a tank designed for the production of plate glass, from which the glass is conducted in a continuous sheet from one end. One object of the invention is the provision of a construction whereby the area in the working end of the tank above the glass may be closed off from the area in the melting end above the glass, to any desired degree. This conserves the heat in the melting end and facilitates the regulation of the temperature in the working end. A further object is to reduce the flow of glass through the neck of the tank from the melting to the working end, so that the excess cooled glass which is not used in producing the sheet and which must be returned to the melting end of the tank, is reduced to a minimum. This requires the heat losses in the working end and tends to keep the body of glass in such end at a lower temperature and more nearly that required in the formation of the sheet. It also conserves the heat in the melting end of the tank. Another object is the provision of an improved arrangement for separating the stream of hot glass flowing to the working end of the tank from the return circulation of cooler glass passing back from the working to the melting end of the tank and for facilitating such return circulation. The separation of the two glass flows avoids blister which tends to form when streams of glass of different temperature intermingle. A still further object is the provision of means for affecting a reduction in the temperature of the glass in the forward end of the melting section of the tank without reducing the temperature of the glass in the main portion of the melting end. This permits the melting of the glass to be carried on at the high temperature required for the proper melting and fining of the glass, while permitting a supply of glass past the neck of the tank to the working end at the relatively lower temperature best adapted for use in such end. The foregoing and other objects, as will appear later, are accomplished by the constructions which will now be described and which are illustrated in the accompanying drawings, wherein:

Figure 1 is a horizontal section on the line of I—I of Fig. 2; Fig. 2 is a vertical section on the line II—II of Fig. 1; Fig. 3 is a section on the line III—III of Fig. 1; Figs. 4, 5, and 6 are transverse sections on the lines IV—IV, V—V, and VI—VI, respectively, of Fig. 1; Figs. 7, 8, and 9 are detail views of one of the skim bars and Fig. 7 being a front elevation, Fig. 8 a plan view and Fig. 9 a section on the line IX—IX of Fig. 7; Fig. 10 is a vertical section similar to that of Fig. 2 of a modification. And Figs. 11 and 12 are transverse sections on the lines XI—XI and XII—XII of Fig. 10.

Referring to the construction of Figs. 1 to 6, 1 is the melting end of the tank and 2 the working end, the melting end of the tank being heated from the ports, 3, 3, etc., connected to the usual regenerators. The working end of the tank is provided with the burners, 4, 4, etc., by means of which the temperature of the glass in the working end may be regulated. At the forward end of the tank is a pot 5 having flues 5a and suitable heating means therebeneath, well known in the art. Glass is withdrawn continuously from the working end of the tank by the driven and cooled rollers 6, 6, the sheet 7 which is formed being carried through a roller annealing lehr in accordance with practice well known in the art. Above the various sections at the working end of the tank are roof members 8, 9, and 10 supported from above, so that they may be adjusted in order to regulate temperature conditions in the glass therebeneath.

Intermediate the two ends of the tank is a neck made up of a transverse wall 11 and a drop arch 12 located in opposition to the wall. The wall and drop arch are of hollow form, as shown, to promote cooling, such cooling being assisted in the transverse wall by means of cooling pipes 13 which discharge air into the wall space. The wall 11 is made up of two end portions 14, 14, whose upper edges lie above the glass level (Fig. 5) and a central portion 15 whose upper edge lies below the glass level to give an opportunity for a flow of glass from the melting to the working end of the tank. Located just above the central portion of the wall is a floater 16 whose function is to act as a skim bar. In order to regulate, and in some cases to entirely close off the atmosphere in the working end of the tank from that of the melting end, a refractory curtain or wall is provided which extends through the drop arch, as indicated in Figs. 2 and 3. This curtain or wall is made up of a series of refractory blocks 16a, placed edge to edge and supported from above by means of the rods 16b, the upper ends of such rods being connected to suitable adjusting means, whereby the position of the blocks may be shifted up and down. When these blocks are in lowered position so that they practically engage the top surfaces of the end wall sections 14, 14 and the floater 16, a practically complete separation is secured between the spaces above the glass in the two ends of the tank. This is a condition which will ordinarily obtain in the normal operation of the tank. When the tank is first started in operation, or when a quick rising temperature in the working end is desired, the blocks are raised so that a free flow of heat can occur from the melting end of the tank to the working end. This separation of the two ends of the tank above the surface of the glass is desirable, as it tends to give cooler glass in the working end of the tank and at the same time conserves the heat in the melting end of the tank, so that the temperature in the melting end may be run as high as desired without interfering with temperature conditions in the working end.

The restriction of the volume of glass flowing from the melting end of the tank to the working end and incident to the use of the wall 11 which has a flow passage only through its central portion, is also desirable, in that it tends to prevent too great a transfer of heat in the glass itself between the two ends of the tank, thus avoiding unnecessary heat losses in the melting end of the tank and permitting the temperature in the working end to be carried at a lower point. Restriction of the glass flow is further advantageous, in that it reduces to a minimum the excess of glass supplied to the working end of the tank, so that the reverse flow of cooled glass from the working end to the melting end is relatively small. In order to provide for the back flow of excess glass which does not go into the sheet, and which must therefore be returned from the working end of the tank to the melting end, a pair of ports 17, 17 are provided through the end sections 14, 14 of the transverse wall at the bottom of such wall (Figs. 3 and 5). These return ports for the cold glass are in alignment with a pair of troughs 18, 18 formed on the bottom of the working end of the tank adjacent the side walls of the tank. The bottoms of these troughs are inclined, as will be seen by reference to Fig. 3, which inclination tends to promote the flow of glass back to the melting end of the tank, as indicated by arrows in Figs. 1 and 3. All of the glass supplied over the central portion 15 of the transverse wall flows forward to the front end of the tank section 2, at which point the stream is divided, one portion flowing on through the pot 5 to the rolls, 6, 6, while the remaining portions flow laterally and downwardly to the forward ends of the troughs 18, 18 where a reverse current is formed to the rear and through the ports 17, 17 into the melting end of the tank.

A skim bar 19 is preferably employed in the melting end of the tank to the rear of the transverse wall 11, and back of this skim bar a second drop arch 20 is provided, this drop arch being preferably located adjacent the last heating port 3 in the melting end of the tank. The purpose of this drop arch is to give a body of glass forward of the arch, which is somewhat cooler than the glass back of the arch. This gives cooler glass flowing over the wall 11, than would otherwise be the case and permits a higher temperature to be maintained in the main portion of the melting section than would be practical, if this drop arch 20 were not used.

By reference to Fig. 1 it will be seen that side recesses are provided at the front end of the working section of the tank designated by the numerals 21, 21. These recesses promote the reverse flow of cooled glass through the troughs 18, 18, and also act to skim the glass surface. Impurities in a forwardly moving body of glass tend to work to the sides of a tank, and the recesses 21, 21 serve to collect a certain amount of such impurities which would otherwise proceed along the side walls of the tank to the rolls 6, 6 and be incorporated into the sheet. The tendency of the impurities collected in the recesses 21, 21 is to cool and gravitate toward the bottom of the tank. This settling action brings impurities into the return streams of glass in the troughs 18, 18, so that they are carried back into the melting tank. Recesses similar to 21, 21 are provided at the forward end of the melting section of the tank, and are designated by the numerals 22, 22. The purpose of these recesses is the same as that described in connection with the recesses 21, 21.

Extending across the forward end of the working section of the tank is a skim bar of novel construction which is shown in detail in Figs. 7 to 9. This skim bar is made up of a plurality of blocks 23, 23, etc., of mullite, mounted side by side upon a water cooled pipe 24, the blocks being secured so that their side surfaces engage by means of the collars 25, 25. The side faces of the blocks are provided with interlocking ribs and grooves, as indicated at 26 in Fig. 8. The ends of the pipe 24 extend through slots in the side walls of the tank and are supported by suitable means whereby the skim bar may be adjusted to any desired height. The bar may also be adjusted by tilting it about the pipe 24 as an axis. This arrangement permits the skim bar of mullite to be employed which would otherwise be impractical since mullite is heavier than glass and cannot be incorporated into a floating skimmer. The construction has the advantage incident to the durability of mullite under severe heat conditions and the further advantage of adjustability.

Figs. 10 to 12 illustrate a modification of the transverse wall construction and the bottom construction of the working section of the tank. In this construction, the central portion 27, of the transverse wall is extended forwardly as indicated at 28 and constitutes a part of the bottom of the tank. This bottom section slants forwardly terminating at the trough 29 which extends transversely of the tank. This transverse trough 29 communicates at its ends with a pair of longitudinal troughs 30, 30, similar to the longitudinal troughs 18 of the construction of Figs. 1 to 9. The troughs 30 discharge at their rear ends through ports 31, 31 corresponding in all respects to the ports 17, 17 of the first type of construction. The section 28 of the tank bottom not only slants forwardly, as indicated in Fig. 10, but also slants laterally, as indicated in Fig. 11, so as to promote a lateral flow of glass to the troughs 30, 30. In other respects the construction of Figs 10 to 12 corresponds to that of Figs. 1 to 9, and similar parts bear similar reference numerals and require no further description.

What I claim is:

1. In a glass tank having a melting end provided with heating means and a working end having means for withdrawing glass continuously from its forward end with a neck between the two ends comprising a bridge wall in the glass and a drop arch above said wall restricting the flow of glass from one end of the tank to the other and partially separating the spaces in the tank ends above the surface of the glass, a drop arch extending across the melting end of the tank to the rear of said neck and partially separating the space forward of such arch above the glass from the space to the rear thereof.

2. In a glass tank having a melting end provided with heating means and a working end having means for withdrawing glass continuously from its forward end, a wall extending across the tank between the two ends having its end portions above the glass level and its central portion below the glass level to permit a flow of glass thereover, a drop arch extending across the tank above said wall with its lower edge spaced above the top of the wall, and a drop arch extending across the tank to the rear of the first arch and dividing the melting end of the tank into two sections, the forward one of which sections is relatively small as compared with the rear section.

3. In a glass tank having a melting end provided with heating means and a working end having means for withdrawing glass continuously from its forward end, a wall extending across the tank between the two ends having its end portions above the glass level and its central portion below the glass level to permit a flow of glass thereover, said wall being provided at each end adjacent the side wall of the tank at the bottom thereof with a return port.

4. In a glass tank having a melting end provided with heating means and a working end having means for withdrawing glass continuously from its forward end, a wall extending across the tank between the two ends having its end portions above the glass level and its central portion below the glass level to permit a flow of glass thereover, said wall being provided at each end adjacent the side wall of the tank at the bottom thereof with a return port and a drop arch extending across the tank above said wall with its lower edge above the top thereof.

5. In a glass tank having a melting end provided with heating means and a working end having means for withdrawing glass continuously from its forward end, a wall extending across the tank between the two ends transversely to the longitudinal center line of the tank having its end portions above the glass level and its central portion below the glass level to permit a flow of glass thereover, a drop arch extending across the tank above said wall with its lower edge spaced above the top of the wall, and a series of vertically adjustable cut-off blocks placed edge to edge and extending through said drop arch.

6. In a glass tank having a melting end provided with heating means and a working end having means for withdrawing glass continuously from its forward end, a wall extending across the tank between the two ends transversely to the longitudinal center line of the tank having its end portions above the glass level and its central portion below the glass level to permit a flow of glass thereover, a skim bar lying in the glass above the central portion of said wall, a drop arch extending across the tank above said wall, and a series of vertically adjustable cut-off blocks placed edge to edge and extending through the drop arch.

7. In a glass tank having a melting end provided with heating means and a working end having means for withdrawing glass continuously from its forward end, a wall extending across the tank between the two ends having its end portions above the glass level and its central portion below the glass level to permit a flow of glass thereover, a skim bar lying in the glass above the central portion of said wall, a drop arch extending across the tank above said wall, and a series of vertically adjustable cut-off blocks placed edge to edge and extending through the drop arch, said wall being provided at each end adjacent the side wall of the tank at the bottom thereof with a return port.

8. In combination in a glass tank having a melting end provided with heating means and a working end having means for withdrawing glass continuously from its forward end, said working end having its bottom provided at the sides of the tank with troughs which slope downwardly from the forward portion of such end to the rear portion thereof, and a wall extending across the tank between the two ends thereof with its end portions above the glass level and its central portion below such level to permit a flow of glass thereover, said wall being provided with ports through its lower portion in line with said troughs to permit a return circulation of glass therethrough from the working end of the tank to the melting end.

9. In combination in a glass tank having a melting end provided with heating means and a working end having means for withdrawing glass continuously from its forward end, said working end having its bottom provided at the sides of the tank with troughs which slope downwardly from the forward portion of such end to the rear portion thereof, and a wall extending across the tank between the two ends thereof with its end portions above the glass level and its central portion below such level to permit a flow of glass thereover, a skim bar lying in the glass above the central portion of said wall, and a drop arch extending across the tank above said wall, said wall being provided with ports through the lower portion in line with said troughs to permit a return circulation of glass therethrough from the working end of the tank to the melting end.

10. In combination in a glass tank having a melting end provided with heating means and a working end having means for withdrawing glass continuously from its forward end, said working end having its bottom provided at the sides of the tank with troughs which slope downwardly from the forward portion of such end to the rear portion thereof, and a wall extending across the tank between the two ends thereof with its end portions above the glass level and its central portion below such level to permit a flow of glass thereover, a skim bar lying in the glass above the central portion of said wall, a drop arch extending across the tank above said wall, and a series of vertically adjustable cut-off blocks placed edge to edge and extending through the arch, said wall being provided with ports through its lower portion in line with said troughs to permit a return circulation of glass therethrough from the working end of the tank to the melting end.

11. In combination in a glass tank having a melting end provided with heating means and a working end having means for withdrawing glass continuously from its forward end, said working end having its bottom provided at the sides of the tank with troughs which slope downwardly from the forward portion of such end to the rear portion thereof, and a wall extending across the tank between the two ends thereof with its end portions above the glass level and its central portion below such level and provided with ports through its lower portion in line with said troughs, the bottom of the working end of the tank at its central portion sloping downward from said wall into a transverse trough leading into the first mentioned troughs and then sloping upward from the transverse trough to the outlet end of the tank.

12. In a glass tank having a melting end provided with heating means and a working end having means for withdrawing glass continuously from its forward end, a skim bar in the working end of the tank comprising a water cooled pipe extending across the tank above the glass level, a series of blocks of mullite mounted side by side on the pipe and depending therefrom to a point below the glass level, and means carried by the pipe for locking the blocks in assembled relation with their side faces in contact, said faces being provided with interlocking means so that the blocks are held in alinement.

KARL G. KUTCHKA.